US009655141B2

(12) United States Patent
Webb

(10) Patent No.: US 9,655,141 B2
(45) Date of Patent: May 16, 2017

(54) USER DEVICE FOR COMMUNICATING DATA AND METHOD

(71) Applicant: SONY CORPORATION, Tokyo (JP)

(72) Inventor: Matthew William Webb, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/904,577

(22) PCT Filed: Jul. 2, 2014

(86) PCT No.: PCT/GB2014/052012
§ 371 (c)(1),
(2) Date: Jan. 12, 2016

(87) PCT Pub. No.: WO2015/019045
PCT Pub. Date: Feb. 12, 2015

(65) Prior Publication Data
US 2016/0174257 A1     Jun. 16, 2016

(30) Foreign Application Priority Data

Aug. 5, 2013 (EP) .................................... 13179325

(51) Int. Cl.
*H04W 74/00*     (2009.01)
*H04W 52/02*     (2009.01)
(52) U.S. Cl.
CPC ..... *H04W 74/006* (2013.01); *H04W 52/0216* (2013.01)
(58) Field of Classification Search
CPC ......................... H04W 74/006; H04W 52/0216
(Continued)

(56) References Cited

U.S. PATENT DOCUMENTS 9,107,184 B2 *   8/2015  Yang .................... H04W 74/002
9,338,790 B2 *   5/2016  Hong .................. H04W 72/121
(Continued)

FOREIGN PATENT DOCUMENTS

EP          2 136 599 A1    12/2009
WO    WO 2008/097023 A1     8/2008

OTHER PUBLICATIONS

International Search Report issued Sep. 29, 2014 in PCT/GB2014/052012.

(Continued)

*Primary Examiner* — Sharad Rampuria
(74) *Attorney, Agent, or Firm* — Oblon, McClelland, Maier & Neustadt, L.L.P.

(57) ABSTRACT

A user device for transmitting and receiving data to and from an infrastructure equipment via a wireless access interface. The user device is configured to receive an indication from the infrastructure equipment of a location and duration of a temporal response window for receiving response messages, the response messages being received in response to access request messages and the location and duration of the temporal response window having been determined by the infrastructure equipment. The user device is configured to transmit an access request message for requesting access to the wireless access interface to the infrastructure equipment, and to receive a response message in response to the access request message from the infrastructure equipment, wherein the user device is configured to receive the response message in the temporal response window.

13 Claims, 10 Drawing Sheets

(58) Field of Classification Search
USPC .................................................. 455/450–453
See application file for complete search history.

(56) References Cited

U.S. PATENT DOCUMENTS

| | | | |
|---|---|---|---|
| 9,426,828 B1* | 8/2016 | Singh | H04W 74/0833 |
| 2009/0303896 A1 | 12/2009 | Che et al. | |
| 2009/0316586 A1 | 12/2009 | Yi et al. | |
| 2010/0002590 A1 | 1/2010 | Park et al. | |
| 2010/0034141 A1* | 2/2010 | Meylan | H04W 74/0833 370/328 |
| 2011/0205908 A1 | 8/2011 | Yi et al. | |
| 2013/0114572 A1* | 5/2013 | Fong | H04L 1/0038 370/336 |
| 2014/0133335 A1 | 5/2014 | Morioka | |
| 2014/0161024 A1 | 6/2014 | Speight et al. | |
| 2014/0204835 A1 | 7/2014 | Speight et al. | |
| 2014/0226558 A1 | 8/2014 | Speight et al. | |

OTHER PUBLICATIONS

"Consideration on RA response window for sTAG" Intel Corporation, 3GPP TSG-RAN W02 #79, Aug. 13-17, 2012, Qingdao, China, R2-123945, Agenda item: 7.1.2, XP050665407, 2 Pages.

"LTE; Evolved Universal Terrestrial Radio Access (E-UTRA) and Evolved Universal Terrestrial Radio Access Network (E-UTRAN); Overall description; Stage 2 (3GPP TS 36.300 version 10.8.0 Release 10)" ETSI TS 136 300 V10.8.0, Jul. 2012, 210 Pages.

"LTE; Evolved Universal Terrestrial Radio Access (E-UTRA); Medium Access Control (MAC) protocol specification (3GPP TS 36.321 version 8.9.0 Release 8)" ETSI TS 136 321 V8.9.0, Jul. 2010, 49 Pages.

"Enhancement to Small Cells for MTC" Qualcomm Incorporated, 3GPP TSG-RAN WG1 #72bis, Apr. 15-Apr. 19, 2013, Chicago, USA, R1-131401, Agenda item: 7.2.4.7, 6 Pages.

"RACH Coverage Enhancement" Qualcomm Incorporated, 3GPP TSG-RAN WG1 #72bis, Apr. 15-Apr. 19, 2013 Chicago, USA, R1-131398, Agenda item: 7.2.4.3, 3 Pages.

U.S. Appl. No. 14/908,184, filed Jan. 28, 2016, Matthew William Webb.

* cited by examiner

USER DEVICE FOR COMMUNICATING DATA AND METHOD

CROSS-REFERENCE TO RELATED APPLICATIONS

The present application is based on PCT filing PCT/GB2014/052012 filed Jul. 2, 2014, and claims priority to European Patent Application 13 179 325.9, filed in the European Patent Office on Aug. 5, 2013, the entire contents of each of which being incorporated herein by reference.

FIELD OF THE DISCLOSURE

The present disclosure relates to user devices for communicating data and methods of communicating data.

BACKGROUND OF THE DISCLOSURE

Extending mobile communications network coverage and increasing a number of devices a mobile communications network can serve is an important aspect of the design and deployment of such networks. Recently, the use of relay nodes and or nodes with reduced functionality compared to an infrastructure equipment such as for example base stations have been promoted as means to achieve both increased coverage by extending the range of base stations, and increased capacity by defining an increased number of smaller cells. In a downlink (transmission from base station to mobile user device) of a communications system, conventional relaying commonly involves a signal transmitted from a base station being repeated by one or more relays of a relay chain until it is received by an intended user device. Similarly, in the uplink (transmission from the mobile user device to base station) the user device would transmit a signal to a relay and the signal would be repeated by one or more relay nodes in a relay chain until it is received by the base station. In this conventional approach, the downlink and uplink signals received and transmitted by the user device will be transmitted from and received at a same relay and or infrastructure equipment and so the uplink and downlink may be said to be coupled.

However, more recently decoupled uplink and downlink communication networks have been proposed in order to increase coverage and capacity. Decoupled uplink and downlink operation may occur for example when uplink only relays are utilised and or uplink and downlink signals are transmitted from and received at different relay nodes and or different infrastructure equipment. For instance, a user device may transmit an uplink signal to a nearby relay but receive its downlink signal directly from a base station, thus the communications paths of the uplink and downlink signals are different. This scenario can lead to increased coverage provided by the base station and may occur due to the greater transmission power of a base station compared to a user device. For example, due to power constraints, a mobile user device may only be able to transmit to a nearby relay whereas the higher transmission power associated with the base station will allow the downlink signal to be transmitted with sufficient power that it can be received directly by the mobile user device.

Although the use of decoupled uplink and downlink communications may provide additional coverage and flexibility to a communications network, a number of problems are presented. For instance, the timing of downlink signals whose transmission time is defined with respect to a transmission of an associated uplink signal may no longer be able to be reliably known at a user device because of the variable and unpredictable propagation times between the user device and the base station due to the presence of relays for example. Communications of this nature are often termed semi-synchronous communications and the random access procedure in an LTE network is an example of such a semi-synchronous procedure. In an LTE network a user device may require uplink resources in order to send a message. If in an unconnected state, the user device may transmit a request for access to the network. In an LTE network, the request for access can be a random access preamble transmitted on a physical random access channel (PRACH). In some networks, the user device may transmit the request for access to a relay which may pass on the request to a base station or another relay, or indicate to the base station by an alternative means that a request for access has been received. The mobile device is configured to wait once the request has been sent and attempt to receive a response to the request during a predefined time period after the transmission of the request. If a response is not received within this period the mobile device may attempt to initiate a subsequent access request procedure. However, due to the variable time for the request to reach the base station via one or more relay nodes, the response to the request for access may not be transmitted by the base station within the predefined time period. Consequently, the user device may waste power by attempting to receive a response to the request when one may not be transmitted until some time into the predefined time period and/or before the end of the predefined time period and also by unnecessarily initiating a subsequent access request procedure when a response is not received before the end of the predefined time period.

SUMMARY OF THE DISCLOSURE

According to an example embodiment of the present disclosure, a user device for transmitting and receiving data to and from an infrastructure equipment via a wireless access interface is provided. The user device is configured to receive an indication from the infrastructure equipment of a location and duration of a temporal response window for receiving response messages, the response messages being received in response to access request messages and the location and duration of the temporal response window having been determined by the infrastructure equipment. The user device is figured to transmit an access request message for requesting access to the wireless access interface to the infrastructure equipment, and to receive a response message in response to the access request message from the infrastructure equipment, wherein the user device is configured to receive the response message in the temporal response window.

The provision of a response window whose timing is determined by the infrastructure equipment allows the response window to be adapted to the transmission of the response message when there is a dynamic or cell specific delay in transmitting the response message. For instance, if the time taken for a access request message to reach the infrastructure equipment and be processed at the infrastructure equipment is variable and unpredictable, the infrastructure defined response window enables the period of time over which the infrastructure equipment may transmit and a user device may receive a response message to be delayed and or extended to a later end time. This may mean that fewer resources in the downlink are allocated to the response window(s) compared to a response window which is not delayed but extended to an equivalent end time, and the user device is not required to be in a receiving mode for an extended continuous window, thus conserving power. Furthermore, this approach increases the probability that a response message transmitted by the infrastructure equipment will be received by the user device. Consequently, this will also reduce the probability that additional access request messages will be made by the user device, thus reducing uplink resource requirements and reducing power consumption at the user device.

Accordingly to another example embodiment of the present disclosure, the user device is configured to receive the response message in one or more of a plurality of temporal response windows, the plurality of response windows separated in time, a location and duration of the temporal response windows having been determined by the infrastructure equipment and the user device having received an indication of a location and duration of at least one of the response windows from the infrastructure equipment.

The provision of a plurality of response windows which are determined by the infrastructure equipment allow the response windows to be adapted to the transmission of the response message when there is a variable, unknown or cell specific delay in transmitting the response message. For instance, if the time taken for a access request message to reach the infrastructure equipment is variable and unpredictable, the response windows enable the period of time over which the infrastructure equipment may transmit a response message and a user device may receive the response message to be extended in a predetermined way without requiring a continuous extended window or delaying of a single window. This means that fewer resources in the downlink are allocated to the response window(s) and the user device is not required to be in a receiving mode for an extended continuous period, thus conserving power. Furthermore, the distribution of the timing of the response windows may take account of a probability that a response message will be ready to be transmitted at a certain point in time. This therefore enables the user device to concentrate its reception efforts on periods where it is most likely that a response message will be transmitted. Consequently, this will also reduce the probability that additional access request messages will be made by the user device, thus reducing uplink resource requirements and further reducing power consumption at the user device.

In another example embodiment of the present disclosure, the user device is configured to transmit the access request message to the infrastructure equipment via one or more relay nodes.

The use of relays in the uplink of the communications system allows the communications system's coverage to be increased. However, introducing relays into the uplink can add further unpredictability to the timing of receiving an access request message and transmitting a response message at the infrastructure equipment. The use of a plurality of response windows may take account of this increased unpredictability by allowing the response windows to be adapted to take account of the unpredictability whilst avoiding unnecessary control information reception and energy consumption the user device.

In another example embodiment of the present disclosure, the indication of a location and duration of at least one of the response windows is received by the user device from the infrastructure equipment prior to the transmission of the access request message.

Providing an indication of the response windows to the user device allows the infrastructure equipment to set cell and user specific response windows. These windows may then take account of delay characteristics and user device priorities which are specific to the infrastructure equipment's cell, thus leading to a more efficient operation of the cell.

In another example embodiment of the present disclosure, the user device is configured to enter a reduced power state during the time separating the response windows. Entering a reduced power state during the period between the response windows allows the user device to conserve power when it has knowledge that a response message will not be transmitted by the infrastructure equipment, thus leading to extended battery life at the user device.

In another example embodiment of the present disclosure, the user device is configured to receive an indication of a timing of at least one of the response windows from the infrastructure equipment in one of the response windows.

Allowing an indication of the timing of a response window in a preceding response window allows the timing of response windows to be dynamically controlled by the infrastructure equipment. For example, if an unforeseen delay has occurred and a response message is unable to be transmitted in a subsequent response window, this may be indicated to the user device. This will therefore allow the user device to avoid attempting to receive a response message during the subsequent response window, thus conserving power.

In another example embodiment of the present disclosure, the user device has an identifier associated therewith and the infrastructure equipment is configured to determine the location and duration of at least one of the response windows based upon the identifier of the user device and a predetermined rule, and the user device is configured to determine the location and duration of the at least one of the response windows based on the identifier associated therewith and the predetermined rule.

Allocating response windows based on user device's identity allows a plurality of response windows to be allocated among a plurality of user devices without the requirement of user device specific signalling information, thus conserving downlink resources and reducing a quantity of signalling information required to be received the user device.

In another example embodiment of the present disclosure the user device is a 3GPP LTE compliant device.

In another example embodiment of the present disclosure the access request message includes a random access preamble and the response message is a random access response Various further aspects and features of the present disclosure are defined in the appended claims, including but not limited to, methods of communicating data between a user device and an infrastructure equipment.

BRIEF DESCRIPTION OF THE DRAWINGS

Embodiments of the present disclosure will now be described by way of example only with reference to the accompanying drawing in which like parts are provided with corresponding reference numerals and in which FIG. 1 provides a schematic illustration of a coupled uplink and downlink relay communications network.

DETAILED DESCRIPTION OF EXAMPLE EMBODIMENTS

Coupled Communications System Architecture

Figure 1:
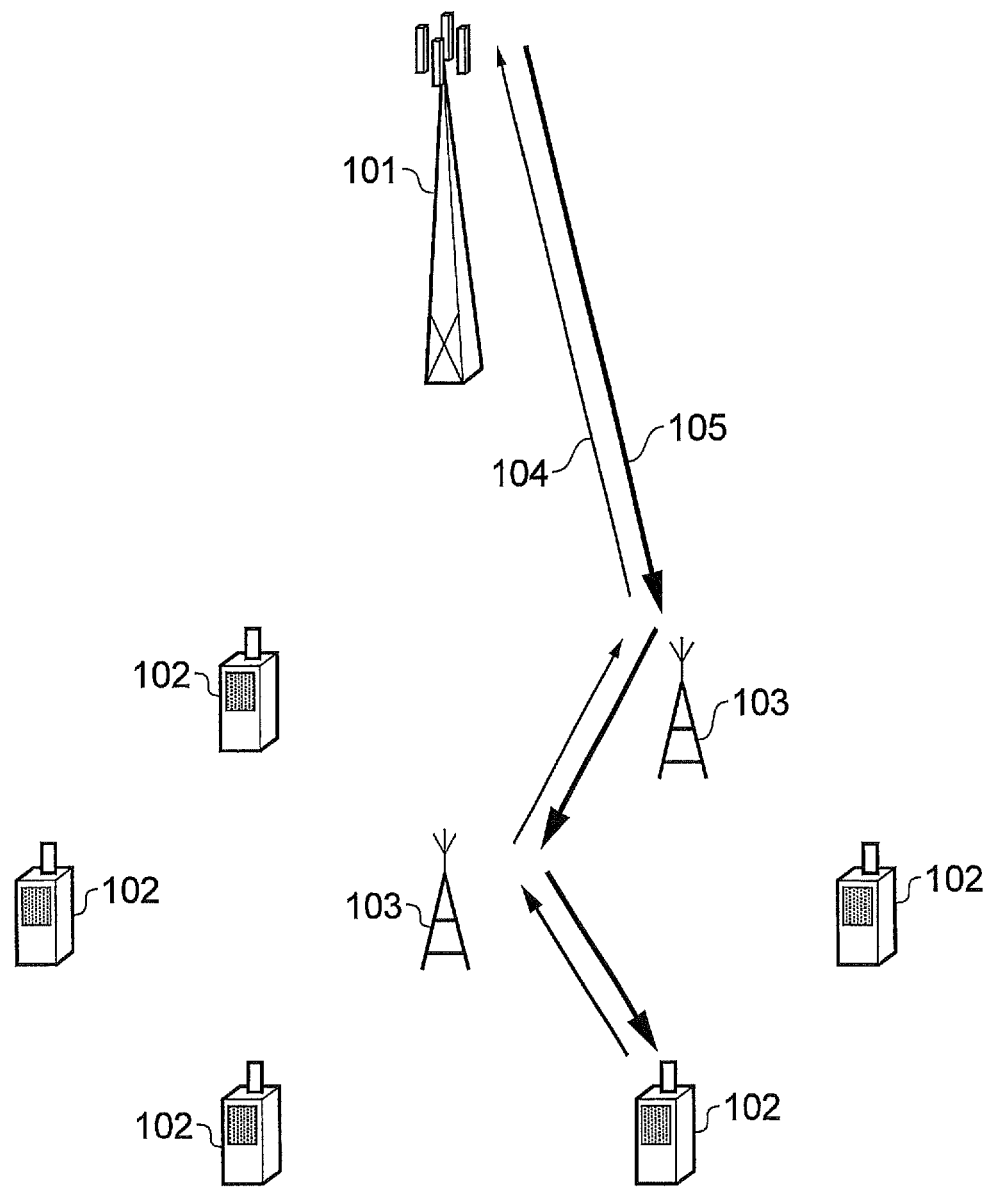

FIG. 1 provides a schematic illustration of a relay based communications system where the uplink and the downlink communications are coupled such that the uplink and downlink signals propagate via the same communications network infrastructure. The system comprises infrastructure equipment such as for example a control node or base station 101, one or more user devices or user equipment (UE) 102 and one or more relays or relay nodes 103, where the base station is arranged to provide a wireless access interface to the user device and to transmit and receive data to and or from the user device 102 via the wireless access interface. The user device 102 communicates in the uplink by transmitting a signal via one or more relay nodes 103 to the base station 101, where the uplink signal path is represented by the arrow 104 and the user device may for example be a high data rate mobile device such as a smart phone or a lower data rate device such as a machine type communications (MTC) device e.g. a smart meter or medical device. In the downlink, the base station 101 transmits a downlink signal via one or more relay nodes 103 where the downlink signal path is represented by the arrow 105. The system of FIG. 1 may operate in accordance with any mobile communications network protocol known in the art, for example it may operate in accordance with 3GPP LTE where the base station may be an enhanced NodeB (eNB). The relay nodes may be dedicated relays nodes which repeat a received signal via known repeating techniques such as amplify and forward or decode and forward. The relay nodes may also be lower functionality base station or user devices which are configured to provide relay functionality. The relay nodes may be connected to the base station via a dedicated backhaul link such as an X2 link or X2 interface, or any other suitable wired or wireless link such as point to point microwave connection. In examples where the relays are lower functionality base stations or eNBs, the relays may form separate cells such as a pico cells, however, the scheduling tasks and the like may still be performed by the base station 101. The uplink and downlink communications over the wireless access interface between the base station, relay nodes and user devices take place within the framework of uplink and downlink time frames which are divided into a number of separate physical channels. The system may also operate in accordance with time division duplexing, frequency division duplexing or any other duplexing or multiple access scheme known in the art. In examples where the network of FIG. 1 operates in accordance with LTE, the user devices 103 will be allocated resources in uplink frames by the base station 101. For example, if the user device is in an unconnected state with the base station and wishes to connect to the base station, the user device is required to perform a random access procedure which acts as request for access to the network.

LTE Random Access Procedure

Figure 2A:
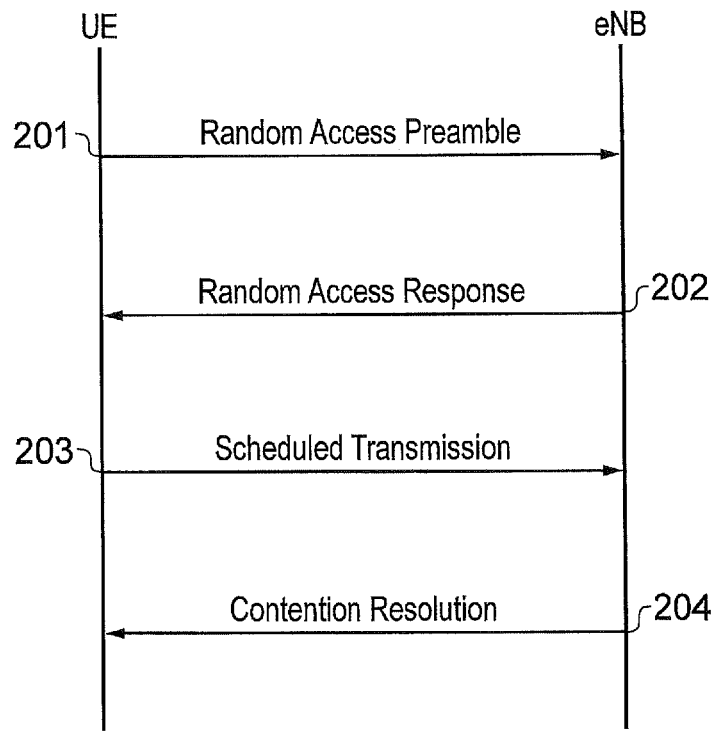
FIG. 2*a* provides an illustration of a contention based access request procedure.

FIG. 2a illustrates an LTE contention based random access procedure that a user device may perform in order to request access to an LTE network. Firstly, the user device selects a random access preamble from a set of contention based random access preambles that has been broadcast in a system information block (SIB) such as SIB2 in a downlink frame by the base station. The user device then transmits the selected random access preamble 201 to the base station where this transmission acts as an access request message for requesting access to the network and the preamble acts as a user device identifier. The random access preamble may be transmitted on a physical channel within the wireless access interface such as a physical random access channel (PRACH) of an uplink frame. Once the random access preamble has been received by the base station, at step 202 the base station transmits a response message, such as for example, a random access response (RAR). The resources in time and frequency of a downlink channel, such as a physical downlink shared channel (PDCCH), in which the user device can find the RAR are indicated in a message on a control channel such as physical downlink control channel (PDCCH) addressed to a random access radio network temporary identifier (RA-RNTI) and which is transmitted in the same subframe as the response message. This message is therefore required to be received prior to receiving the response message. In particular, a downlink control information (DCI) message informing the user device of the resources where the response message can be found in the current subframe is sent on the PDCCH, where the RA-RNTI is formed from a time and, in some examples, a frequency identifier of transmission of the associated access request message. The response message contains at least the identity of the received preamble, a timing alignment command, an allocated uplink resource grant and a temporary Cell RNTI (C-RNTI). Upon receiving the response message, the user device transmits a scheduled transmission containing its intended message, such as a radio resource controller (RRC) connection request, in the allocated uplink resources as shown by step 203. Finally at step 204, upon receiving the intended message the base station transmits a contention resolution message. The contention resolution message is then acknowledged by the user device to which the contention resolution message is addressed, for example with a HARQ ACK/NACK. This procedure thus overcomes the possibility of multiple user devices utilising the same preamble and or transmitting a random access request over the same channel at the same time.

Figure 2B:
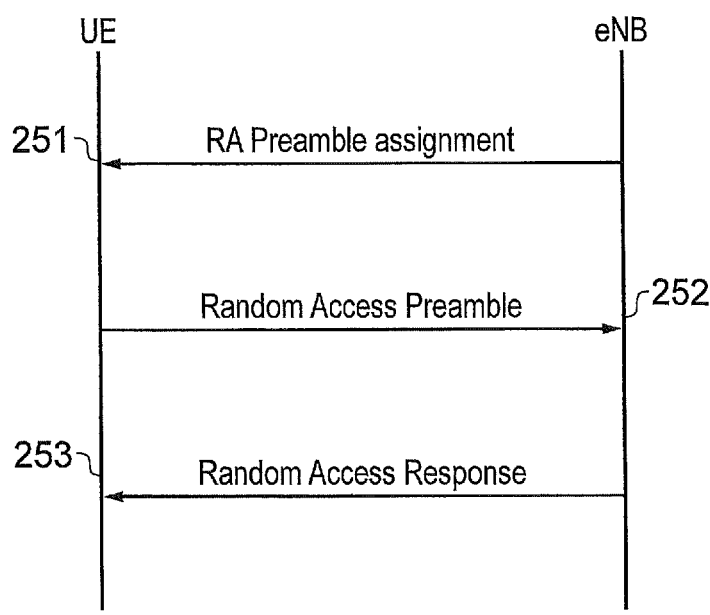
FIG. 2*b* provides an illustration of non-contention based access request procedure.

FIG. 2b illustrates an example non-contention based random access procedure for requesting resources in an LTE network. At step 251, prior to the transmission of a random access preamble from the user device in the access request message, the base station allocates a preamble from a non-contention based set of preambles to the user device. This allocation may be performed via a format 1A downlink control information (DCI) message on the PDCCH or in a handover command if the user device has recently entered a cell served by the base station. At step 252 the user device transmits its allocated preamble to the base station. Once the preamble has been received at the base station, the base station transmits a response message, such as for example a random access response, at step 253 where the response message contains similar information to the response message sent at step 202 of FIG. 2a. Once the response message has been received at the user device, the user device then transmits its intended message in the allocated uplink resources indicated in the response message.

Although the access request procedures of FIGS. 2a and 2b has been described with reference to sending a receiving messages directly from a base station, the messages may also be sent and received via one or more relays using the same procedure. For example, the messages may be sent and received via the communications paths illustrated in FIG. 1, where in the uplink a receiving relay either relays a message to another relay or a base station, and in the downlink relays the message to another relay or a user device.

Response Windowing

Both access request procedures described above are reliant on reception of a response message at the user device. In an LTE system the response message is transmitted on a physical downlink shared channel (PDSCH) and is scheduled by information on a physical control channel such as a PDCCH. In systems such as LTE, in order to ensure that a user device does not attempt to receive a response message continuously from the point in time of the transmission of the access request message until a response is received, the response message is transmitted by the base station in a predetermined temporal response message window. In LTE, when the access request message is a random access request and the response message is a random access response, such a window may be referred to as a random access response window or a RAR window. A response window may reduce the amount of power consumed at the user device because a finite time period during which the user device will attempt to receive a response message is defined. The response window is defined with respect to the transmission of the access request message, such as three subframes after transmission in LTE, and the user device is configured to begin to attempt to receive the response message when the response window commences. In an LTE system the process of receiving a response message includes the user device checking the PDCCH of each subframe within the response window for a relevant DCI containing PDSCH scheduling information addressed to its RA-RNTI. When such scheduling information is found, the user device receives and decodes the response message in the PDSCH of the corresponding subframe, where the response message contains an indication of the preamble the user device sent to the base station in the access request message. Once a response message is successfully received the user devices ceases to check the PDCCH for response message scheduling information. If a response message is not received by a user device within the response window, after a minimum wait period the user device begins a subsequent new access request procedure, where the subsequent access request procedure is similar to those previously described with reference to FIGS. 2a and 2b. Multiple response messages for different user devices may be transmitted by the base station within each response window therefore reducing congestion. If multiple response messages are present in a single response window the user devices may differentiate between them by means of the RA-RNTI to which they are addressed and the preamble they each contain.

An access request procedure such as that described above may be referred to as being semi-synchronous with the user device preamble transmission. This is as a result of the response window being defined with respect to the subframe containing the end of the user device preamble transmission. This is opposed to the response window being directly defined with regards to a downlink subframe. More specifically, in LTE systems the response window commences three subframes after the subframe containing the end of the user device preamble transmission and has a length indicated in the SIB2 block in which the preamble configuration is broadcast. According to 3GPP LTE Release 11 specifications, the duration of the response window may be at least one subframe for the contention based random access procedure and at least two subframes for the non-contention based random access procedure. However, these windows may not be longer than 10 subframes. The response window lengths and structure specified for LTE are suitable for coupled uplink and downlink LTE system such as that illustrated in FIG. 1 and non-relay based systems where the latency of communications between a user device and a base station are consistent and predictable and there beginning of the response window can be fixed. However, the length, location and structure of the response window may not be suitable where latency in communications between the user device and the base station are neither consistent not predictable.

Decoupled Communications System Architecture

Figure 3:
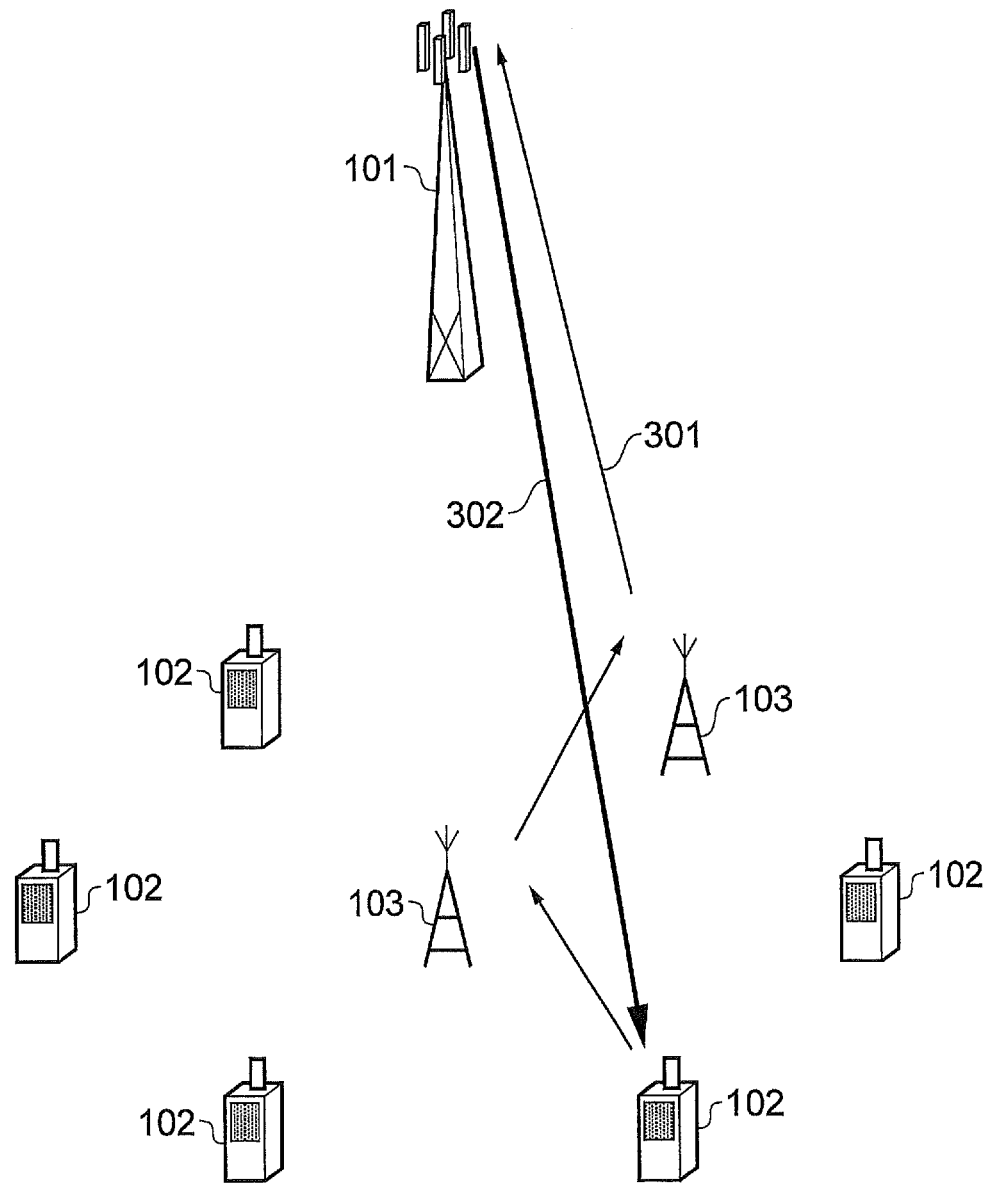
FIG. 3 provides a schematic illustration of a decoupled uplink and downlink relay communications network.

FIG. 3 provides a schematic diagram of a second example communications network. The networks of FIG. 1 and FIG. 3 are substantially similar, however, the uplink and downlink of the network of FIG. 3 are decoupled. In FIG. 3 decoupling refers to the different nodes which the user device transmits data to and receives data from, for example the user device transmits data to a relay node but receives data directly from the control node or infrastructure equipment 1011n this example, these communications paths may arise because the relay nodes are uplink only relays and therefore unable to participate in the downlink. A situation as illustrated in FIG. 3 may also arise without the presence of uplink only relays when a base station transmits at a significantly higher power than a user device. In such a scenario, the downlink signal may have sufficient power to reach the user device directly but the user device may only be able to transmit at a power sufficient to reach a nearby relay node which then relays the uplink signal to the base station. The aforementioned definition of decoupling is from the user device's perspective, however, a more general definition may be to define decoupling as when the communications paths of the uplink and down link are different i.e. the relays and/or the infrastructure equipment involved in the uplink and downlink communications paths differ. An advantage of uncoupled communications is that coverage provided by a base station may be increased because a greater number of user devices may be able to connect to a base station even though they cannot directly communicate with the base station.

Semi-synchronous access request procedures such as those described with reference to FIGS. 2a and 2b may also be used in conjunction with the communication network arrangement of FIG. 3. However, a number of problems may result due to the decoupled nature of the uplink and downlink communications and the fixed response window timing.

The propagation time of an uplink access request message from the user device to the base station may be variable due to the latency associated with the communications interfaces between the relay nodes and the base station. In some circumstances, these delays may result in the base station being unable to transmit the response message within a response window as described above. This may in turn lead to the user device which transmitted the access request message expending power attempting to receive a response message within the response window when it is unlikely that one will be transmitted. For the case of delay tolerant user devices such as for example MTC devices, a delay in performing an access request procedure in itself is not critical. However, these devices are commonly low power devices and therefore the power expended in an extended access request procedure is a concern. In the case of user devices such as smart phones, they may require both a rapid and low power access request procedure thus failing to receive a response message is also a concern. Furthermore, in LTE systems if a response message is not received at a user device, the user device may increase the transmit power of a subsequent access request message and may therefore expend a comparatively greater amount of power when performing a subsequent access request procedure. These problems may also be exacerbated by the presence of an increased number of relays in the uplink and/or downlink communications path. A number of relays in the uplink communications path may increase unpredictability in the propagation time of an access request message to the base station. A simple solution to these problems would be to extend the maximum length of the response window so that the probability of a response message being transmitted within the response window is increased. For instance, a maximum response window could be defined according to a maximum delay associated with the number of relays in the uplink. Although this would reduce the probability that a subsequent access request procedure will be performed by the user device, attempting to receive a response message over an extended window would increase the power consumption of the user device. For example, in an LTE system the user device will be required to receive control information in the PDDCH of each subframe of the response window for an indication of the access response message in the downlink data channel PDSCH. This approach is not an efficient means to achieve reception of a response message nor does it provide the flexibility that may be required when the latency of communications between relay nodes and the base station are highly variable and unpredictable due, for example, to congestion on backhaul links.

Although the problems associated with unpredictable response message transmissions are present in a decoupled uplink downlink communications system, they may also apply to other network architectures and semi-synchronous communications procedures. For example, the presence of at least one relay in the either the uplink or downlink may introduce variability and unpredictability into the reception of access request messages at a base station and the subsequent reception of a response messages at a user device. This variability and unpredictability, may thus lead to inefficiencies in the reception of semi-synchronous message responses i.e. response messages as previously described. Furthermore, in systems where there is a varied processing time associated with a semi-synchronous or synchronous request at the base station it may prove difficult to accurately define an anticipated reception time of a reply to the request without wasting power at the user device due to the use of an extended response window.

Flexible Response Windowing

Figure 4:
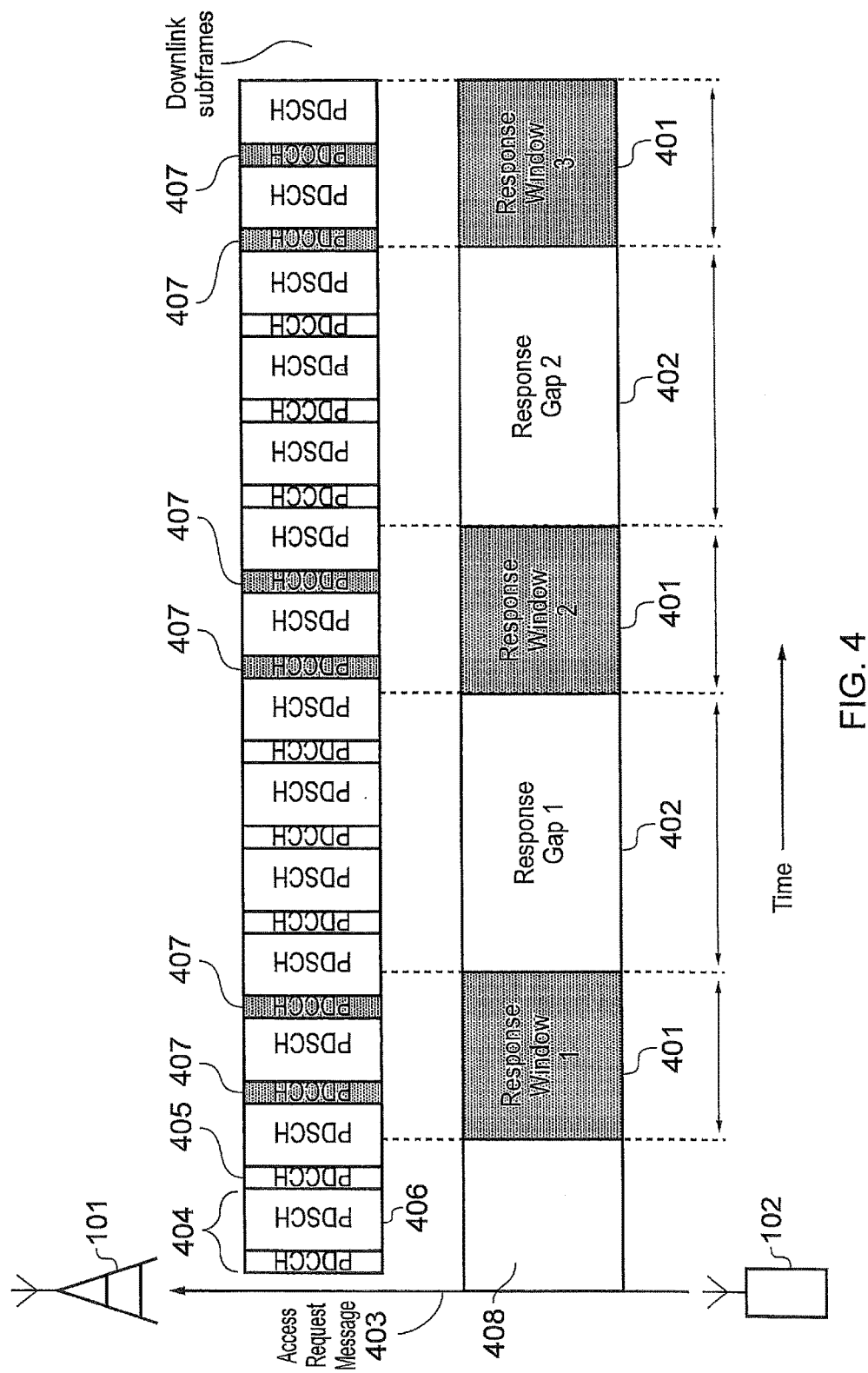
FIG. 4 provides an illustration of response windowing in accordance with an embodiment of the present disclosure.

According to an example embodiment, in a communications system such as an LTE system, a timing of a plurality of temporal response windows are determined and indicated to a user device by the base station, where the timing may include locations in time and durations, both of which may be variable. The base station is then configured to transmit response messages only within a response window. However, in some embodiments one or more response windows with a variable start time and length may be used and the base station's transmission adjusted accordingly. The user device is configured to receive and check a control channel for an indication of a response message only during the response window(s). For instance an LTE device may check the PDCCH of subframes during a response window for a DCI message addressed to its RA-RNTI, where the PDCCH corresponds to the content of the PDSCH in the subframe. Outside of the response windows the user device may enter a reduced power state such as DRX. FIG. 4 provides a schematic illustration of a response windowing pattern or scheme in accordance with this embodiment where an indication of the response windowing may be transmitted within a physical layer control channel such as a PDCCH in LTE. The response windows 401 are separated in time where the time periods between the windows may be referred to as response gaps 402 and during which the user device may enter a reduced power state such that it does not receive or transmit. Response messages are transmitted by the base station within one of the response windows 401 after the access request message 403 has been transmitted by the user device 102 and received by the base station 101. Response messages are attempted to be received by a user device within each of the response windows 401. Also in FIG. 4, downlink subframes 404 of a wireless access interface that correspond in time with the response windows are illustrated, where each subframe 404 includes a control channel PDCCH 405 and a data channel PDSCH 406 as may be found in LTE subframes. During the response windows the user device receives resource allocation data in the PDDCH 407 transmitted by the base station. If the presence of a response message is indicated by data received across a PDCCH the user device will then receive the relevant data transmitted across an associated PDSCH. The response windows may be synchronous or non-synchronous with the subframes of the downlink, where in a synchronous implementation the response windows may commence at the same time as a PDDCH. However, in either case, if a PDDCH of a subframe does not fall within a response window the effect is that the PDSCH of the subframe is not received by the user device.

This arrangement of response windows allows for extended delays to be accounted for in the access request procedure without the use of an extended continuous response window, thus reducing a number of consecutive PDDCH instances that the user device is required to receive data from. For example, not all the PDDCH instances between the start of the first response window and the end of the last response window are required to be received with the aforementioned response windowing. This in turn may reduce power consumption at the user device because it can enter a reduced power state during periods when a response message will not be transmitted such as during the response gaps. In addition to this, the procedure may also increase the likelihood of receiving a response message. For instance, the overall period between transmission of an access request message and the end of the response window(s) may be increased compared to a single response window with an equivalent total duration. Furthermore, variable duration in time and multiple response windows may also reduce the adverse effects on system capacity that an extended continuous response window may have.

Although the response windows are shown to be of equal duration in time in FIG. 4 they may also be of different durations. Likewise, the response gaps may also be of different durations. When implemented in the previously described relay systems, the user device transmits an access request message at 403 and after an initial delay 408 the response windowing begins. The response windowing is defined by the base station and may either be cell specific or user device specific. In the case of cell specific response windowing, an indication of the timing of the response windows in terms of duration and location may be signalled. For instance, in an LTE system response windows may be signalled in a system information block such as SIB2 by adding an additional information element (IE), or in another signalling resources that a user device is capable of receiving prior to transmitting an access request message. In the case of user device specific windowing, in an LTE system if a non-contention based random access procedure is utilised a device specific response windowing could be signalled to a user device along with a preamble prior to the random access procedure illustrated in FIG. 2b.

Cell specific response windowing may require less signalling overheads than user device specific response windowing but may not provide the same degree of flexibility. For instance, with user device specific response windowing the base station may take account of different priorities of different user devices and schedule their response windows accordingly. For example, if a particular user device such as a smart phone requires a rapid response to a request for access, the base station may schedule response windows of a longer duration and closer to the initial request than for a user device which does not require a rapid response, such as smart meter. A situation such as this may occur when a high mobility user device is passing through a cell served by a base station and therefore has a high probability of handover. Due to the possibility that the user device may enter and leave a cell in a relatively short period of time it would be beneficial for an access request procedure for this device to be completed more quickly than for a stationary device within the cell. Examples of prioritisation procedures may include prioritised scheduling over a communications interface between relay nodes and the base station in order to reduce any latency, and or the prioritisation of processing of the access request message at the base station.

The duration of a plurality of response windows may be signalled by the base station using an indication of their periodicity, window duration and a total number of windows, the start and end of each response window individually, the response gaps, or a combination of these indicators. Each of these indicators may be suited to a different arrangement of response windowing. For instance, individual response windowing may be suited to response windows which are of different durations, whereas indicating the periodicity of the response window may be suited for response windowing where the windows are of an equal duration and equally spaced. In some embodiments, signalling of the response windowing by the base station may not be required but instead the response windowing will be hardcoded into the user device by virtue of for example the specifications of the wireless access interface. This hardcoded response windowing may act as default response windowing that may be overridden or adapted by subsequent signalling. However, in some embodiments it may be the only response windowing available in the cell or to a user device.

In another example embodiment a base station may indicate an initial cell specific response windowing pattern but in a subsequent control message, such as a DCI message in LTE. The control message may be transmitted in a response window where the the base station may indicate in the control message a dynamic configuration of the next response window, thus overriding the initial windowing. For example, in LTE in a response window numbered n the base station may transmit a DCI message indicating the location and duration of the next response window numbered n+1, or a later response window. In some embodiments a user device may cease to attempt to receive a response message in the current window when a dynamic response windowing message is received and enter a reduced power mode because it infers that there is to be no response message for it in the current response window. Alternatively, user devices may continue to attempt to receive a response message in the current response window and if one is received, ignore the n+1 response window. If an updated response window configuration is not received the user devices may return to using the cell specific response windowing pattern. Dynamic response windowing may be applied to both individual and multiple user devices and also include response windowing which is dependent on the current conditions within the system, such as communications latency and processing times at the base station.

The time period 404 represents the initial time period before the start of response windowing and may be signalled in response window signalling. However, in some embodiments it may be a common time period equal to a conventional delay in a fixed response window system i.e. three subframes in an LTE system. An initial time period equal to a conventional delay may be required in order to provide compatibility with legacy user devices which utilise a single fixed response window. In other embodiments, in order to further aid compatibility with legacy devices in LTE systems, the total duration of the response windowing including the response gaps may be configured to be equal to the conventional single response window duration such that even a response message transmitted in one of a plurality of response windows may be received by a legacy device which operates with a single response window.

Outside of the response windows in the response gaps, user devices may be configured to enter a reduced power state in which they do not attempt to receive downlink and or transmit uplink signals. In LTE devices, DRX is an example of such a state where in order to reduce power consumption the user device does not attempt to receive some downlink signals.

Figure 5:
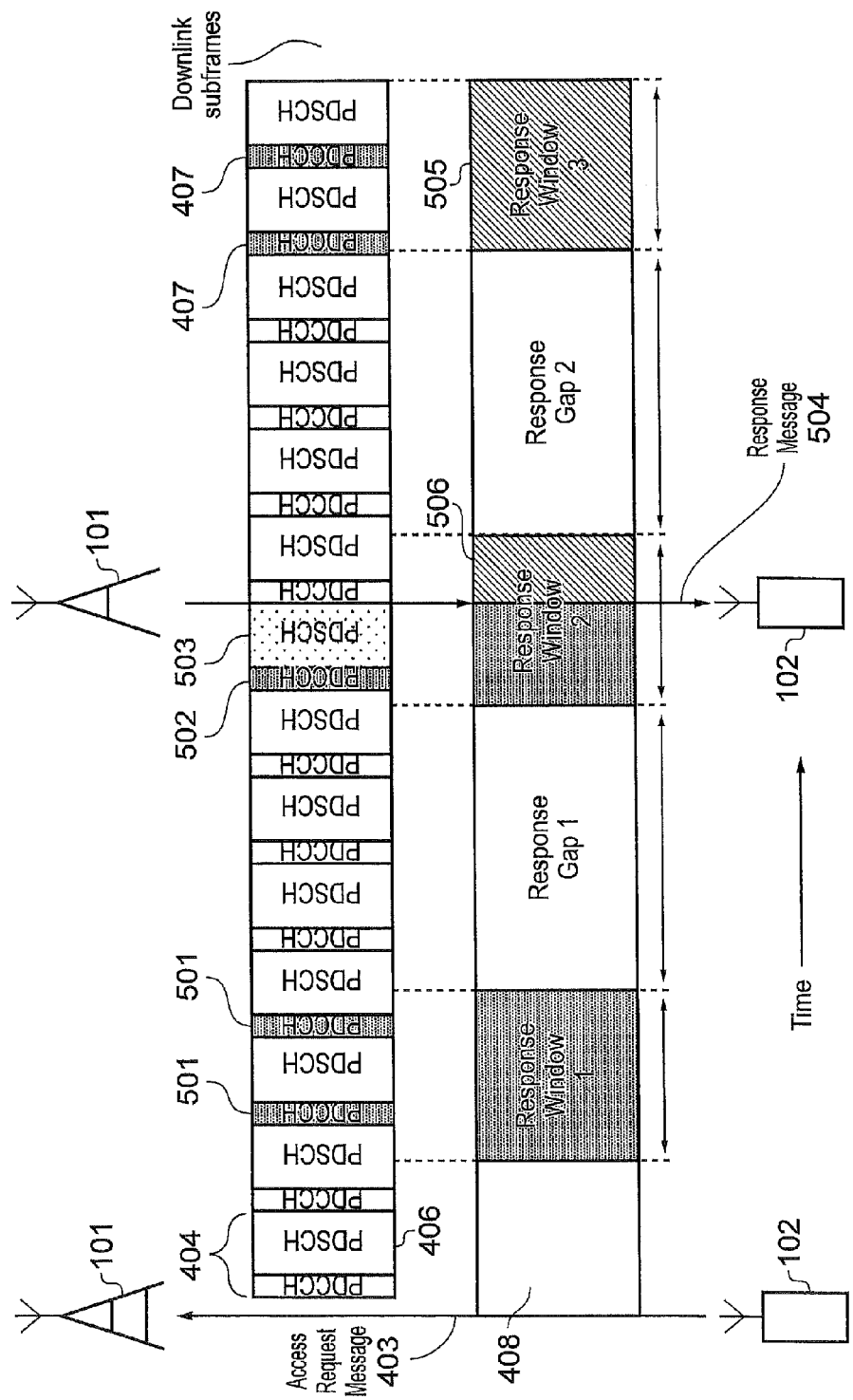
FIG. 5 provides an illustration of response windowing in accordance with an embodiment of the present disclosure.

Once a user device has received a response message in a response window, it may cease receiving and checking a relevant control channel such as a PDCCH for information on downlink resources. This situation is illustrated in FIG. 5 where downlink subframes 404 that correspond in time with the response widows are illustrated in a similar manner to FIG. 4. In FIG. 5, the user device receives data across PDDCH instance 501 but does not receive a response message. However, in PDCCH 502 and PDSCH 503 the response message 504 is sent by the base station 101 and received by the user device. Therefore the user device no longer attempts to receive a response message in the remaining response window 505 and partial response windows 506. Consequently, the user device does not receive data across the PDDCH instances following PDCCH 502.

Figure 6:
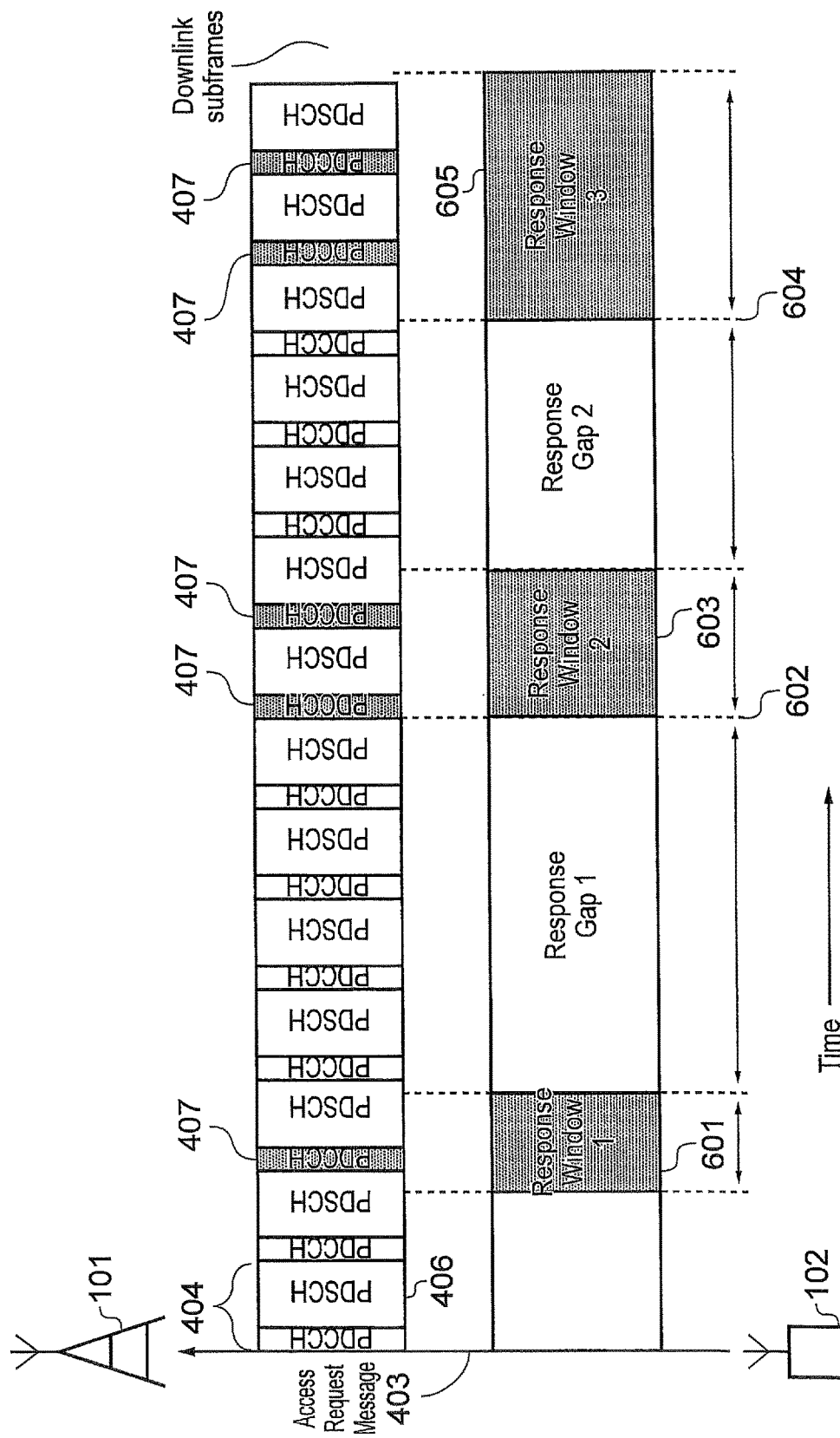
FIG. 6 provides an illustration of response windowing in accordance with an embodiment of the present disclosure.

FIG. 6 provides an illustration of an embodiment of response windowing which is similar to that described with reference to FIG. 4 but where the duration of the one or more of the response windows is different. Also in FIG. 6, downlink subframes which correspond in time with the response windows are shown alongside the response windows as illustrated in FIGS. 4 and 5. This windowing arrangement may be beneficial when the probability of a response message being transmitted varies over time and therefore between the response windows. For example, in the system of FIG. 3, due to propagation delays, processing delays, latency and or congestion it may be unlikely that a response message will be transmitted by the base station within the first response window 601. Response window 601 has been configured to have a shorter duration. Likewise, there may be an increased probability that a response message will be transmitted after point 602 compared to 601 and therefore response window 603 is of an increased duration. Response window 605 is thus the longest duration response window because there is a highest probability that a response message will be transmitted after point 604. Although in some embodiments a response message may only be transmitted in a response window, the actual response message may have been processed and generated at the base station prior to commencement of a next response window. Consequently, if a response message has been generated at a base station it may be buffered or stored in an appropriate memory until the commencement of the next response window.

Punctured Response Windowing

Figure 7:
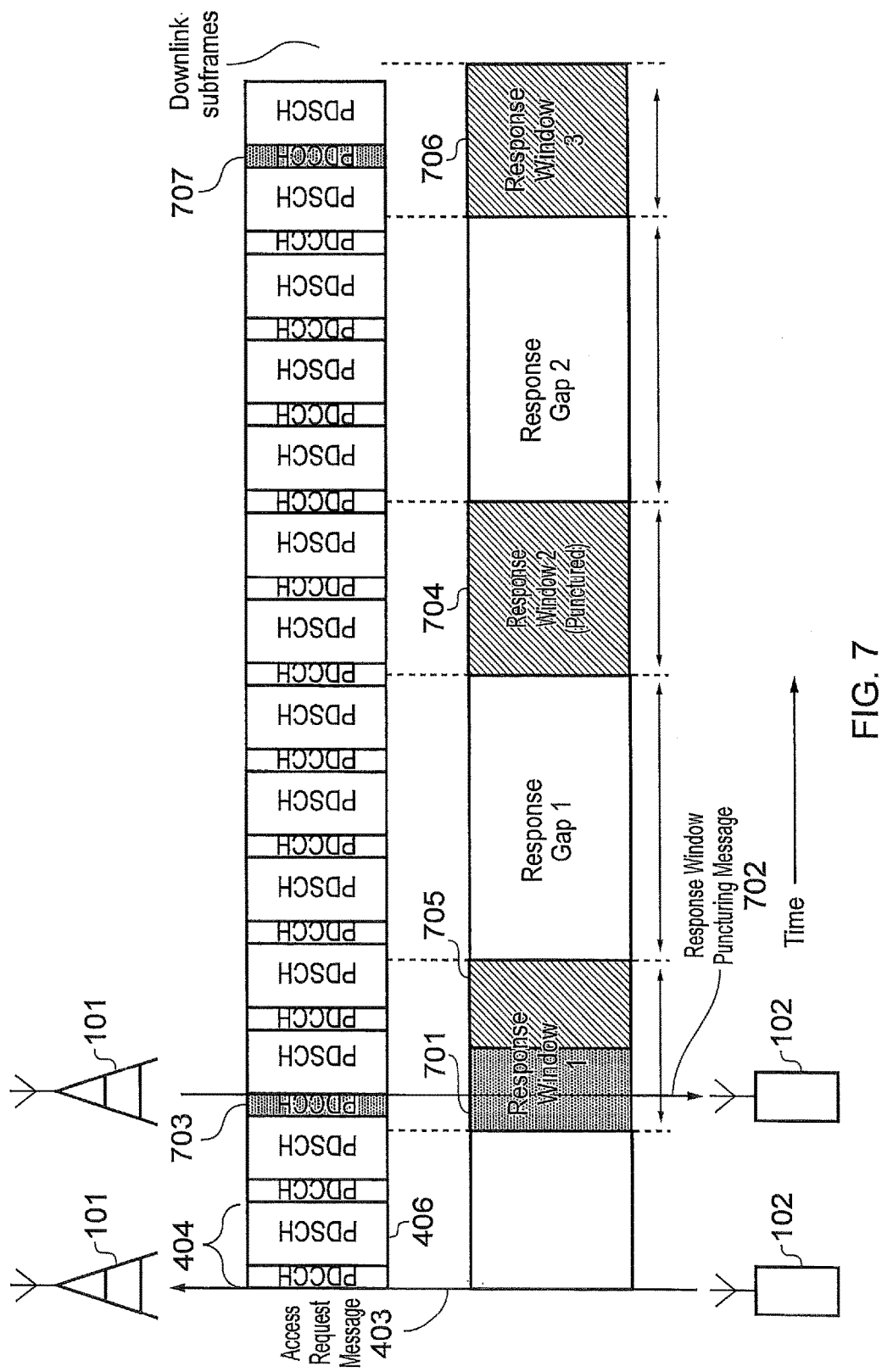
FIG. 7 provides an illustration of response windowing in accordance with an embodiment of the present disclosure.

In some embodiments the base station and the user device may be configured to perform response window puncturing, where in one response window the base station indicates to the user device that a response will not be transmitted in the next response window(s) or until a specified point in time. FIG. 7 illustrates response windowing in accordance with such an embodiment, where downlink subframes 404 which correspond in time with the response windows are shown in a similar manner to FIGS. 4, to 6. During response window 701 the base station indicates to the user device at 702 via a response window puncturing message in PDCCH 703 that a response message will not be transmitted in the next response window 704 and the remaining period of the current response window 705, or not transmitted until the response window 706. Consequently, the user device may cease attempting to receive data indicating a response message transmitted across the PDCCH until the commencement of the response window 706, where it receives data across PDCCH 707. Consequently, the user device may enter a reduced power mode, such as DRX, after reception of the response window puncturing message in PDDCH 703 and until the commencement of the response window 706. This procedure may therefore also include immediately ceasing to attempt to receive a response message in the current response window 701. Signalling of the response widowing in this embodiment is required to be performed during a preceding response window so that the user device is not in a reduced power state and thus able to receive the signalling. For example, in an LTE system the signalling to skip a response window n+1 may take the form of a DCI transmitted during the nth response window. An advantage of placing the response window 'skip' message in a resource such as a DCI is that the user device only need decode and receive data from the PDCCH rather than the PDCCH and the PDSCH, thus reducing power consumption. Furthermore, resources in the PDSCH are not taken up by the response window signalling and so the associated adverse effects on the capacity of the PDSCH are avoided. The decision to skip a response window by a base station may be based on a number of factors that affect the ability of a base station to transmit a response message. For instance, latency and delays on interfaces between relay nodes and the base station, processing delays at the base station, congestion and associated scheduling decisions at the base station, current access request message load such as random access channel (RACH) load in LTE, and any other system condition that the base station may have knowledge of.

User Device Dependent Response Windowing

Figure 8:
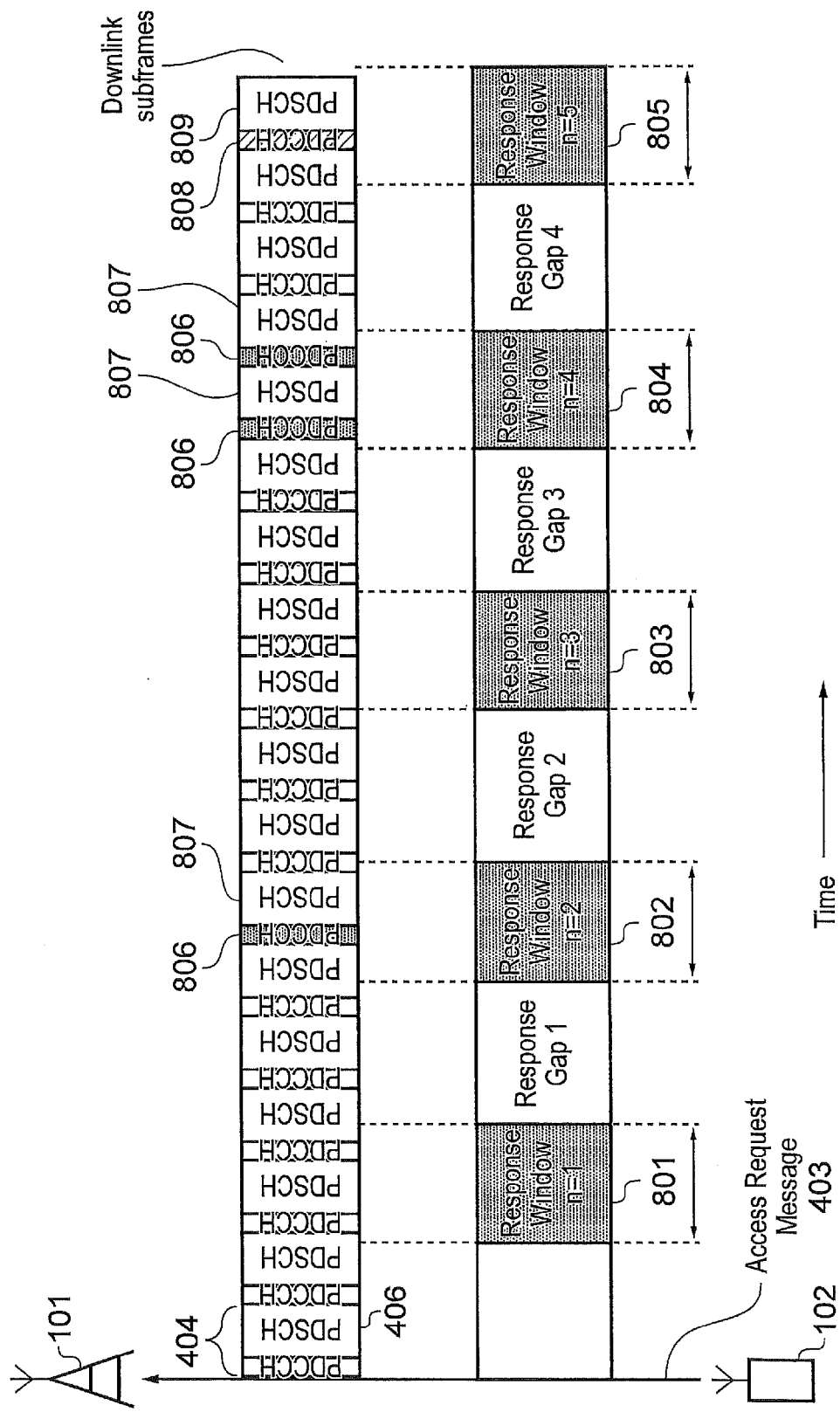
FIG. 8 provides an illustration of response windowing in accordance with an embodiment of the present disclosure.

In another embodiment, the response windowing for a user device may be dependent on the identity of the user device. For example, in an LTE system a user device's response windowing may be dependent on its non-access stratum (NAS) identity such as a system architecture evolution (SAE)-temporary mobile subscriber identity (S-TMSI), random access preamble identifier (RAPID) or if it is RRC_CONNECTED, its C-RNTI. In a previous embodiment it was described that each user device may be allocated an individual response windowing pattern. However, in this present embodiment the identity of a user device may be used to select a response windowing pattern from a set of cell specific response windowing patterns. FIG. 8 illustrates such an arrangement where downlink subframes 404 which correspond in time with the response windows are shown in a similar manner to FIGS. 4 to 7. In FIG. 8 each of the response windows is numbered from n=1 to n=5 and in one example the allocation of the response windows to user devices may be performed in accordance with the rule n mod l=k where l is a decimal identity associated with a user device. For instance, in FIG. 8, if a user device has identity l=2 and k=0, the user device will be allocated response windows 802 (n=2) and 804 (n=4) and therefore the base station would only transmit a response message intended for this device in response windows 802 and 804 and across corresponding PDCCH 806 and PDSCH 807. Accordingly, the user device would therefore attempt to receive a response message in the response windows 802 and 804 and across corresponding PDDCH 806 and PDSCH 807. Likewise, if l=5 and k=0 a user device and the base station would be configured to transmit and receive respectively a response message in response window 805. Consequently the user device would receive control data across PDCCH 808 and the associated response message across PDSCH 809 if a response message is indicated by the control data. In some embodiments the rule with which the window allocation is determined may also be predetermined and known to user devices such that a user device is able to determine which windows it has been allocated based on the rule and its identifier. This approach therefore overcomes the need for window allocations to be indicated to the user device by the infrastructure equipment. These embodiments may find application when a large number of response messages are required to be sent by the base station due to an event triggering many user devices to perform an access request procedure. In such a scenario, in order to avoid congestion in the response windows, response window allocation described above may be used to avoid transmitting every pending response message in each response window. Although in this and previous embodiments it has been described that each user device may be allocated response window or response windowing pattern, in some embodiments one or more user devices may be allocated the same response window or response window pattern and multiple response messages sent in them. An approach such as this allows increased flexibility in response window allocation thus reducing congestion, whilst also reducing the required downlink resources compared to allocating a unique response window or response window pattern to each user device.

Figure 9:
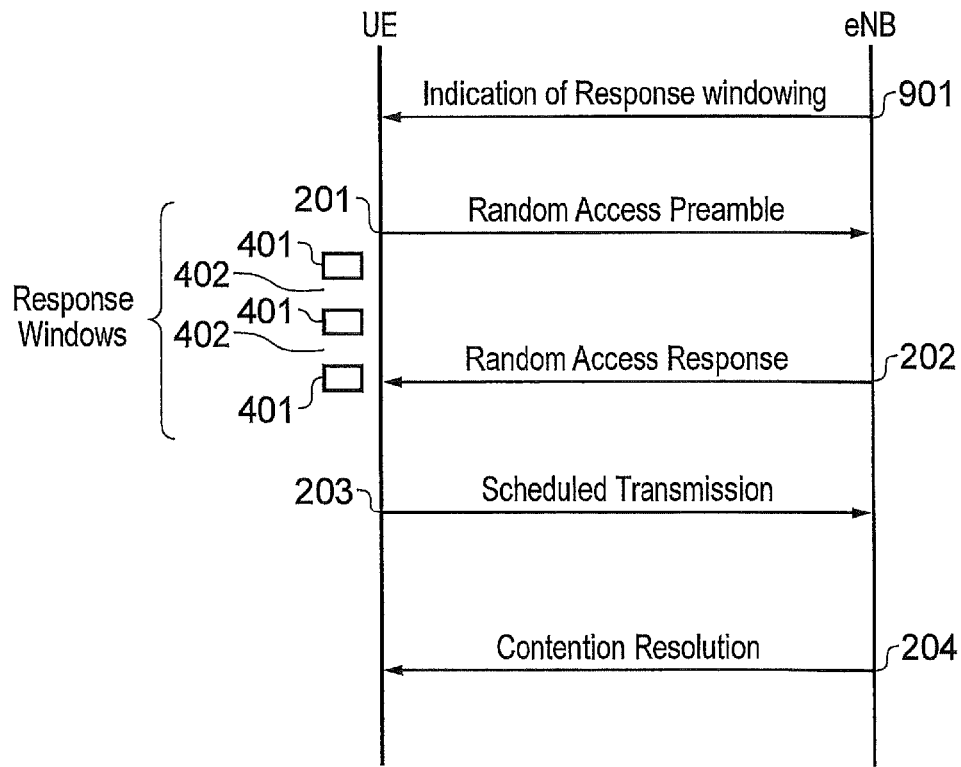
FIG. 9 provides an illustration of an access request procedure in accordance with an embodiment of the present disclosure.
Figure 10:
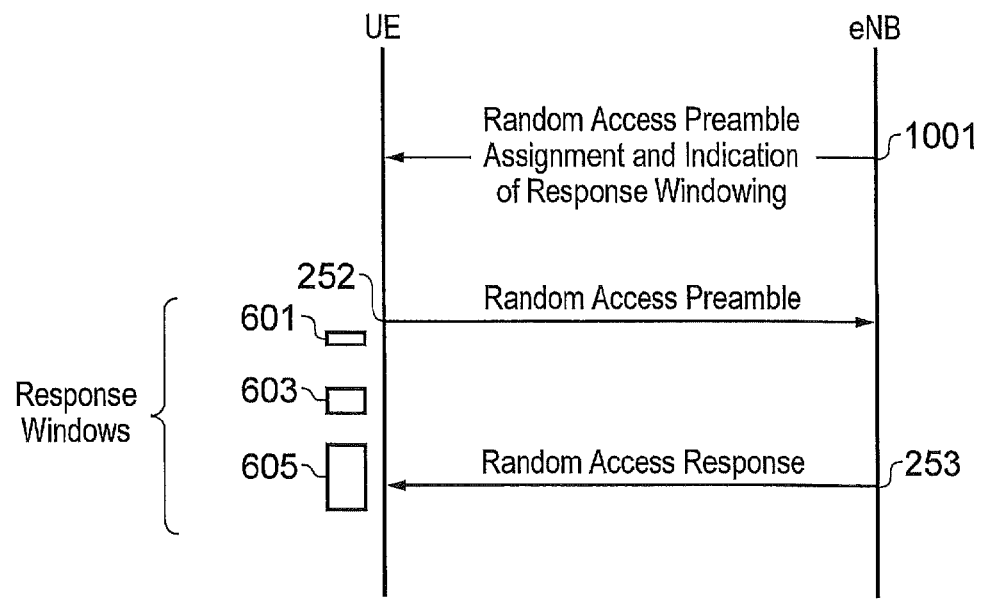
FIG. 10 provides an illustration of an access request procedure in accordance with an embodiment of the present disclosure.
Figure 11:
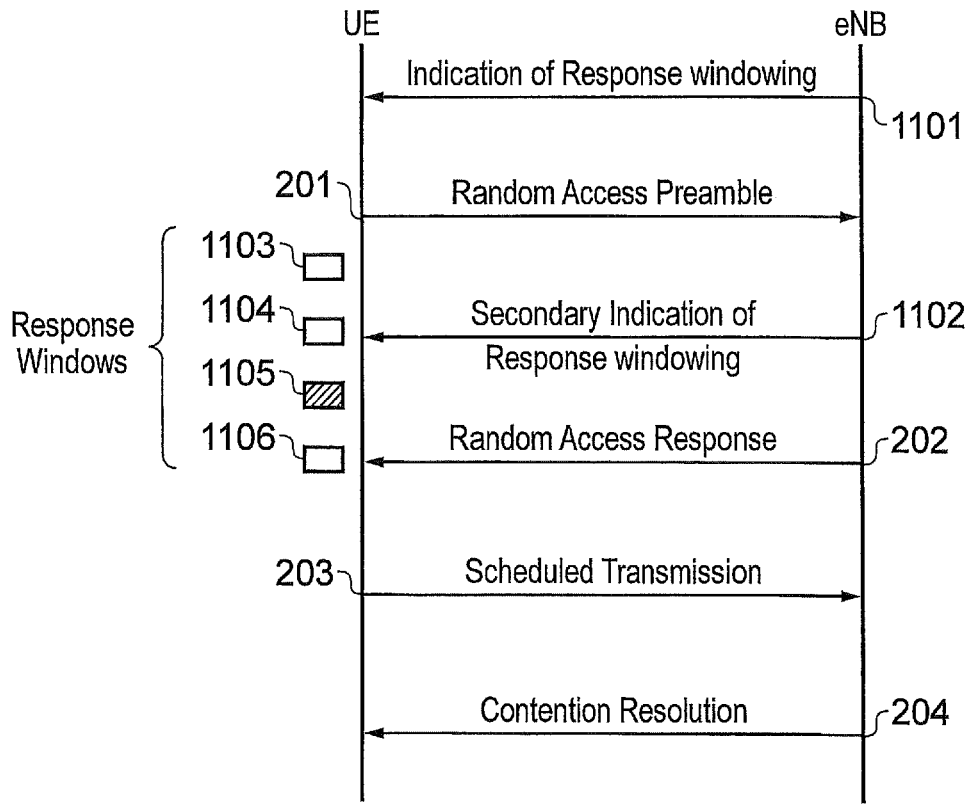
FIG. 11 provides an illustration of an access request procedure in accordance with an embodiment of the present disclosure.
Figure 12:
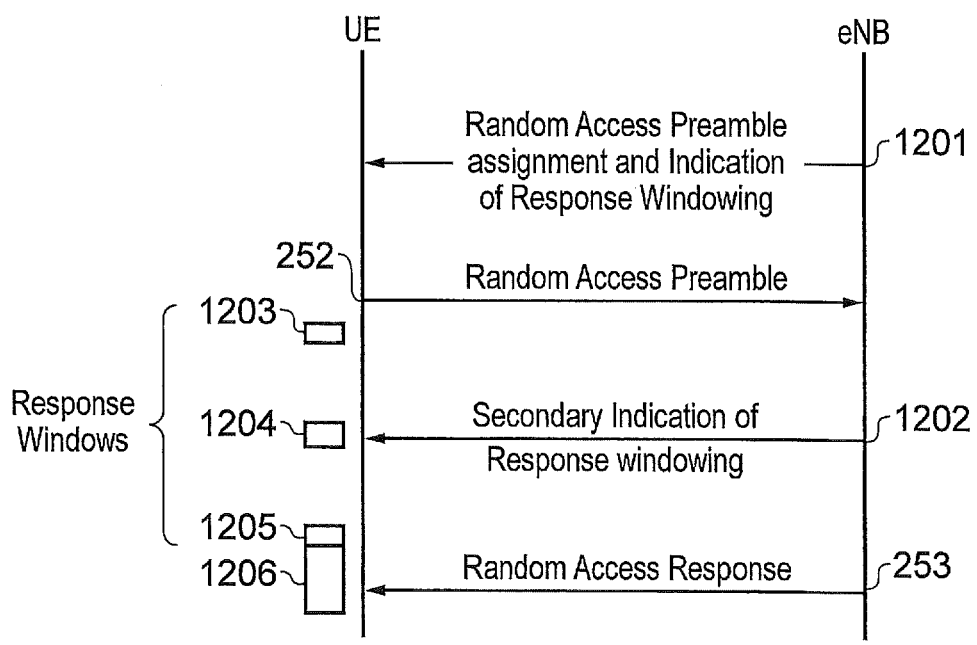
FIG. 12 provides an illustration of an access request procedure in accordance with an embodiment of the present disclosure.

FIGS. 9 to 12 provide illustrations of example access request procedures with response windowing which are in accordance with a number of the previously described embodiments and implemented in an LTE systems. In the LTE system the access request procedure is a random access procedure where an access request message is a random access preamble transmission and a response message is a random access response (RAR). FIGS. 9 and 11 illustrate contention based random access procedures with response windowing, where a number of the steps are substantially similar to those of FIG. 2a and only the additional steps are described below. FIGS. 10 and 12 illustrate non-contention based random access procedures with response windowing where a number of the steps are substantially similar to those of FIG. 2b and only the additional steps are described below.

In FIG. 9 the random access procedure includes the user device receiving device specific or cell specific information at step 901 which indicates the response windowing, where the response windowing may correspond to that of FIG. 4. Once the user device has transmitted its access request message at step 201 it is configured to enter a reduced power state and then exit the reduced power state for each response window 401 until it receives the response message as a RAR during the third response window at step 202. Once the RAR has been received the random access procedure continues as described with reference to FIG. 2a.

In FIG. 10 the random access procedure includes the user device receiving device specific response windowing information at step 1001, where the response windowing may correspond to that of FIG. 6. Once the user device has transmitted its access request message at step 252 it is configured to enter a reduced power state and then exit the reduced power state for each response window 601, 603 and 605 until it receives the RAR during the third response window 605 at step 253. Once the RAR has been received the random access procedure continues as described with reference to FIG. 2b.

In FIG. 11 the random access procedure now includes receiving cell specific information indicating the response windowing at step 1101, and subsequently receiving a secondary indication of response windowing at step 1102, where the response windowing may correspond to that of FIG. 7. Once the user device has transmitted its access request message 201 it is configured to enter a reduced power state and then exit the reduced power state for each response window 1103 to 1106. However, during response window 1104 the user device receives a secondary indication of response windowing at step 1102 which specifies that response window 1105 is punctured i.e. no RAR will be transmitted in the next response window or the RAR will be transmitted in the nth+2 response window. Consequently, the user device may remain in the reduced power state between response windows 1104 and 1106 and exit for response window 1106 in which it receives the RAR at step 202. Once the RAR has been received the random access procedure continues as described with reference to FIG. 2a.

In FIG. 12 the random access procedure now includes the user device receiving device specific and or cell specific response windowing information at step 1201 and subsequently receiving a secondary indication of response windowing at step 1202. Once the user device has transmitted its access request message at step 252 it is configured to enter a reduced power state and then to exit the reduced power state for each response window 1203 to 1205. However, during response window 1204 the user device receives a secondary indication of response windowing at step 1202 which indicates that the next response window 1205 has been extended in duration to form response window 1206. As a consequence the user device exits the reduced power mode for an extended period corresponding to response window 1206. Once the RAR has been received at step 253 the random access procedure continues as described with reference to FIG. 2b.

The above described embodiments allow request procedures such as access request procedures in systems with variable and unpredictable delays, for example those with decoupled uplink and downlink communications, to operate more efficiently. In particular, user devices that are performing a request procedure that require a response to be transmitted are no longer dependent on fixed response windows when the transmission of a response may be unpredictable due to latency and delays between relay nodes and a base station for example. This may result in a reduced number of unsuccessful request procedures and therefore a reduced number of request procedures in total. In addition to the power savings at the user device and in the system as a whole, the reduction in request procedures may also lead to reduced interference in a system's wireless access interface. For example, for random access requests in an LTE system, interference in physical channels such as the physical uplink shared channel (PUSCH) and physical uplink control channel and across cell edges may be reduced. Furthermore, fewer request procedures will also utilise fewer resources in the wireless access interface. For example, in LTE systems because response messages are transmitted in the PDSCH (with control information in the PDDCH), a reduced number of access request messages will reduce the impact on the capacity of the PDSCH.

Although embodiments have been described with reference to messages for requesting access and to random access procedures in an LTE system, embodiments may also find application in other semi-synchronous and synchronous procedures in both LTE systems and other communications system. For example, flexible and control node defined windowing may be applied to the broadcast and reception of system information in an LTE system. In an LTE system SIB2 and higher SIBS are transmitted periodically over the PDSCH within system information windows (SI-windows). Consequently, if a base station wishes to use the capacity on PDSCH for other data, it may signal to user devices the revised windowing in which the SIBs will be transmitted in a manner analogous to that described above. Furthermore, although the embodiments have been described with reference to particular physical and logical channels of an LTE system, their operation is not limited to use with these channels. The embodiments may be used with any equivalent physical or logical channels in LTE or other communication architecture, for example, PDCCH communications may be conveyed on the enhanced PDCCH (EPDCCH) in future releases of LTE or in another form of control channel in an alternative communications system. Likewise, response windowing may be utilised when no control data specifying resources in a data channel is transmitted but instead the response in transmitted directly in the data channel.

Various further aspects and features of the present technique are defined in the appended claims and various combinations of the features of the dependent claims may be made with those of the independent claims other than the specific combinations recited for the claim dependency.

Modifications may also be made to the embodiments hereinbefore described without departing from the scope of the present technique. For instance, although a feature may appear to be described in connection with particular embodiments, one skilled in the art would recognise that various features of the described embodiments may be combined in accordance with this disclosure.

The following numbered clauses provide further aspects and examples of the present disclosure:

1. A user device for transmitting and receiving data to and from an infrastructure equipment via a wireless access interface, the user device configured
to receive an indication from the infrastructure equipment of a location and duration of a temporal response window for receiving response messages, the response messages being received in response to access request messages and the location and duration of the temporal response window having been determined by the infrastructure equipment,
to transmit an access request message for requesting access to the wireless access interface to the infrastructure equipment, and
to receive a response message in response to the access request message from the infrastructure equipment, wherein
the user device is configured to receive the response message in the temporal response window.

2. A user device according to clause 1, wherein the user device is configured to receive the response message in one or more of a plurality of temporal response windows, the plurality of response windows separated in time, a location and duration of the temporal response windows having been determined by the infrastructure equipment and the user device having received an indication of a location and duration of at least one of the response windows from the infrastructure equipment.

3. A user device according to clauses 1 or 2, wherein the user device is configured to transmit the access request message to the infrastructure equipment via one or more relay nodes.

4. A user device according to clauses 2 or 3, wherein the indication of a location and duration of at least one of the response windows is received by the user device from the infrastructure equipment prior to the transmission of the access request message.

5. A user device according to any of clauses 2 to 4, wherein the user device is configured to enter a reduced power state during the time separating the response windows.

6. A user device according to any of clauses 2 to 5, wherein the user device is configured is configured to receive the indication of a location and duration of at least one of the response windows from the infrastructure equipment in one of the response windows.

7. A user device according to any of clauses 2 to 6, wherein the user device has an identifier associated therewith and the infrastructure equipment is configured to determine the location and duration of at least one of the response windows based upon the identifier of the user device and a predetermined rule, and the user device is configured to determine the location and duration of the at least one of the response windows based on the identifier associated therewith and the predetermined rule.

8. A user device according to any preceding clause, wherein the user device is a 3GPP LTE compliant device.

9. A user device according to any preceding clause, wherein the access request message includes a random access preamble and the response message is a random access response.

10. A method for transmitting and receiving data from and to a user device to and from an infrastructure equipment via a wireless access interface, the method comprising
receiving an indication from the infrastructure equipment of a location and duration of a temporal response window for receiving response messages, the response messages being received in response to access request messages and the location and duration of the temporal response window having been determined by the infrastructure equipment,
transmitting an access request message for requesting access to the wireless access interface to the infrastructure equipment from the user device, and
receiving a response message in response to the access request message from the infrastructure equipment at the user device, wherein the method comprises
receiving the response message at the user device in the temporal response window.

11. A user device for transmitting and receiving data to and from an infrastructure equipment via a wireless access interface, the user device configured
to transmit an access request message for requesting access to the wireless access interface to the infrastructure equipment, and
to receive a response message in response to the access request message from the infrastructure equipment, wherein
the user device is configured to receive the response message within one or more of a plurality of temporal response windows, the plurality of response windows separated in time and the user device having been provided with an indication of the location and duration of at least one of the plurality of temporal response windows.

12. A user device according to clause 11, wherein the user device is configured to transmit the access request message to the infrastructure equipment via one or more relay nodes.

13. A user device according to clauses 11 or 12, wherein the user device is configured to enter a reduced power state during the time separating the response windows.

14. A user device according to any of clauses 11 to 13, wherein the access request message includes a random access preamble and the response message is a random access response

The invention claimed is:

1. A user device for transmitting and receiving data to and from an infrastructure equipment via a wireless access interface, the user device comprising:
circuitry configured to:
receive an indication from the infrastructure equipment of a location and duration of a temporal response window for receiving response messages, the response messages being received in response to access request messages and the location and duration of the temporal response window having been determined by the infrastructure equipment,
transmit an access request message for requesting access to the wireless access interface to the infrastructure equipment,
receive a response message in response to the access request message from the infrastructure equipment in the temporal response window,
associate an identifier with the user device, wherein the infrastructure equipment is configured to determine the location and duration of at least one of temporal response windows based upon the identifier associated with the user device and a predetermined rule, and determine the location and duration of the at least one of the temporal response windows based on the identifier associated with the user device and the predetermined rule.

2. The user device as claimed in claim 1, wherein the circuitry is further configured to receive the response message in one or more of a plurality of temporal response windows, the plurality of temporal response windows separated in time, a location and duration of the temporal response windows having been determined by the infrastructure equipment and the user device having received an indication of a location and duration of at least one of the temporal response windows from the infrastructure equipment.

3. The user device as claimed in claim 1, wherein the circuitry is further configured to transmit the access request message to the infrastructure equipment via one or more relay nodes.

4. The user device as claimed in claim 2, wherein the indication of a location and duration of at least one of the temporal response windows is received by the user device from the infrastructure equipment prior to the transmission of the access request message.

5. The user device as claimed in claim 2, wherein the circuitry is further configured to enter a reduced power state during the time separating the temporal response windows.

6. The user device as claimed in claim 2, wherein the circuitry is further configured is configured to receive the indication of a location and duration of at least one of the temporal response windows from the infrastructure equipment in one of the temporal response windows.

7. The user device as claimed in claim 1, wherein the user device is a 3GPP LTE compliant device.

8. The user device as claimed in claim 1, wherein the access request message includes a random access preamble and the response message is a random access response.

9. A method for transmitting and receiving data from and to a user device to and from an infrastructure equipment via a wireless access interface, the method comprising:
receiving an indication from the infrastructure equipment of a location and duration of a temporal response window for receiving response messages, the response messages being received in response to access request messages and the location and duration of the temporal response window having been determined by the infrastructure equipment;
transmitting an access request message for requesting access to the wireless access interface to the infrastructure equipment from the user device;
receiving a response message in response to the access request message from the infrastructure equipment at the user device in the temporal response window;
associating an identifier with the user device;
determining, by the infrastructure equipment, the location and duration of at least one of temporal response windows based upon the identifier associated with the user device and a predetermined rule; and
determining, by the user device, the location and duration of the at least one of the temporal response windows based upon the identifier associated with the user device and the predetermined rule.

10. A user device for transmitting and receiving data to and from an infrastructure equipment via a wireless access interface, the user device comprising:
circuitry configured to:
transmit an access request message for requesting access to the wireless access interface to the infrastructure equipment,
receive a response message in response to the access request message from the infrastructure equipment within one or more of a plurality of temporal response windows, the plurality of temporal response windows separated in time and the user device having been provided with an indication of a location and a duration of at least one of the plurality of temporal response windows,
associate an identifier with the user device, wherein the infrastructure equipment is configured to determine the location and duration of the at least one of the temporal response windows based upon the identifier associated with the user device and a predetermined rule, and
determine the location and duration of the at least one of the temporal response windows based on the identifier associated with the user device and the predetermined rule.

11. The user device as claimed in claim 10, wherein the circuitry is further configured to transmit the access request message to the infrastructure equipment via one or more relay nodes.

12. The user device as claimed in claim 10, wherein the circuitry is further configured to enter a reduced power state during the time separating the response windows.

13. The user device as claimed in claim 10, wherein the access request message includes a random access preamble and the response message is a random access response.

* * * * *